United States Patent
Hasoon et al.

(10) Patent No.: US 10,737,949 B2
(45) Date of Patent: Aug. 11, 2020

(54) RADIATION SOURCE FOR INTRA-LUMEN IMAGING CAPSULE

(71) Applicant: CHECK-CAP LTD., Isfiya (IL)

(72) Inventors: Salah Hasoon, Shfaram (IL); Yoav Kimchy, Haifa (IL)

(73) Assignee: CHECK-CAP LTD, Isfiya (IL)

( * ) Notice: Subject to any disclaimer, the term of this patent is extended or adjusted under 35 U.S.C. 154(b) by 0 days.

(21) Appl. No.: 16/301,455

(22) PCT Filed: Jun. 27, 2017

(86) PCT No.: PCT/IL2017/050711
§ 371 (c)(1),
(2) Date: Nov. 14, 2018

(87) PCT Pub. No.: WO2018/008014
PCT Pub. Date: Jan. 11, 2018

(65) Prior Publication Data
US 2019/0284062 A1  Sep. 19, 2019

Related U.S. Application Data

(60) Provisional application No. 62/358,608, filed on Jul. 6, 2016.

(51) Int. Cl.
*C01G 55/00* (2006.01)
*C22B 3/08* (2006.01)
(Continued)

(52) U.S. Cl.
CPC .......... *C01G 55/004* (2013.01); *C01G 55/00* (2013.01); *C22B 3/08* (2013.01); *C22B 11/04* (2013.01); *C22B 11/042* (2013.01); *G21G 1/001* (2013.01); *C01P 2006/88* (2013.01); *G21G 2001/0094* (2013.01); *Y02P 10/214* (2015.11)

(58) Field of Classification Search
CPC ...... C01G 55/00; C01G 55/004; C22B 11/042
See application file for complete search history.

(56) References Cited

U.S. PATENT DOCUMENTS 2,610,907 A * 9/1952 Stein .................... C01G 55/004
                                                    423/22
2,813,130 A * 11/1957 Keeler .................... B01J 23/96
                                                    568/860
(Continued)

OTHER PUBLICATIONS

Bri Haye C et al: 11 Reactor production and purification of osmium-191 for use in a new AIA9A10s/AIA9A1Amir radionuclide generator system 11, Applied Radiation and Isotopes, International Journal Ofradi ATI on Applications and Instrumentation, Part A, Pergamon Press Ltd, GB vol. 40, No. 2, Jan. 1, 1989 (Jan. 1, 1989), pp. 183-191, XP024706943, ISSN: 0883-2889, DOI: 10.1016/0883-2889(89)90196-2 [retrieved on Jan. 1, 1989]* p. 184, column 2, paragraph 3-paragraph 5*.

(Continued)

*Primary Examiner* — Melissa S Swain
(74) *Attorney, Agent, or Firm* — Soroker Agmon Nordman (57) ABSTRACT

A method of separating Osmium from Iridium, including receiving a powdered mixture of Osmium and Iridium, oxidizing the Osmium of the powdered mixture, capturing the oxidized Osmium in a trapping solution, reducing the oxidized Osmium from the solution to release the Osmium.

19 Claims, 4 Drawing Sheets

(51) Int. Cl.
    *C22B 3/00*         (2006.01)
    *G21G 1/00*         (2006.01)

(56) References Cited

U.S. PATENT DOCUMENTS

| | | |
|---|---|---|
| 3,413,114 A | 11/1968 | Illis et al. |
| 9,284,623 B2 | 3/2016 | Suzuki et al. |
| 2001/0006612 A1 | 7/2001 | Grehl et al. |
| 2014/0154156 A1* | 6/2014 | Suzuki .................. C22B 11/042 423/22 |
| 2014/0328736 A1 | 11/2014 | Engelbrecht et al. |

OTHER PUBLICATIONS

Wang Fang et al: "Simultaneous separation of noble metals osmium and iridium in simulated leaching of spent catalysts using nano-alumina microcolumn" Separation and Purification Technology, vol. 152, Aug. 10, 2015 (Aug. 10, 2015), pp. 108-114, XP02926230, ISSN: 1383-5866, DOI: 10.1016/J.SEPPUR.2015.08.014 * 2. Experimental method; p. 109, column 1-column 2 *.

* cited by examiner

RADIATION SOURCE FOR INTRA-LUMEN IMAGING CAPSULE

RELATED APPLICATIONS

The present application claims priority from U.S. Provisional application No. 62/358,608 filed on Jul. 6, 2016 the disclosure of which is incorporated herein by reference.

TECHNICAL FIELD

The present disclosure relates generally to investigating the insides of a patient using an intra-lumen imaging capsule and more specifically to the radiation source for performing the investigation.

BACKGROUND

One method for examining the gastrointestinal tract for the existence of polyps and other clinically relevant features that may provide an indication regarding the potential of cancer is performed by swallowing an imaging capsule that will travel through the gastrointestinal (GI) tract and viewing the patient's situation internally. In a typical case the trip can take between 24-48 hours, after which the imaging capsule exits in the patient's feces. Generally the capsule will be surrounded by non-transparent liquids therefore a radioactive material is used to image the patient and not a visible light source.

Typically the patient swallows a contrast agent to enhance the imaging ability of the imaging capsule. Then the patient swallows the imaging capsule to examine the gastrointestinal tract while flowing through the contrast agent. The imaging capsule typically includes a radiation source, for example including a radioisotope that emits X-rays or Gamma rays. The radiation is typically collimated to allow it to be controllably directed in a specific direction during the imaging process. In some cases the imaging capsule is designed to measure Compton back-scattering and/or X-ray florescence and wirelessly transmit the measurements (e.g. a count rate) to an external analysis device, for example a computer or other dedicated instruments.

In a typical implementation a radio-opaque contrast agent is used so that a position with a polyp will have less contrast agent and will measure a larger back-scattering count to enhance accuracy of the measurements. Alternatively, other methods may be used to image the gastrointestinal tract.

U.S. Pat. No. 7,787,926 to Kimchy, the disclosure of which is incorporated herein by reference, describes details related to the manufacture and use of such an imaging capsule.

The radiation source used in the imaging capsule should preferably have a long half-life so that it does not need to be used immediately after preparation, rather there would be sufficient time to ship a few imaging capsules to a clinic and have them applied without urgency, for example within a few days before they expire.

Generally a selected amount of radioactive material is placed in a radiation chamber in the imaging capsule. However since the radioactive material is generally a dense molecule it interferes with itself and blocks a large portion of the radiation from being emitted from the imaging capsule. Therefore it is desirable to have the radioactive material arranged differently in the radiation chamber to enhance the emission of radiation.

SUMMARY

An aspect of an embodiment of the disclosure relates to a system and method for separating an Osmium powder to serve as a radiation source for an intra-lumen imaging capsule. An Osmium powder is bombarded with a neutron flux forming a powder comprising various isotopes of Osmium and Iridium, for example Os 191 and Ir 192. A chemical process is used to separate between the Osmium and Iridium.

In the chemical process the Osmium in the powder is oxidized into gaseous form. The oxidized Osmium is then captured into a trapping solution serving as a collection trap. Optionally, the gas may be transferred through multiple tubes serving as collection traps with the trapping solution to completely dissolve the gas. After dissolving the gas in the trapping solution can be collected and a reducing solution is added to the trapping solution to release the Osmium from the trapping solution.

In an exemplary embodiment of the disclosure, the trapping solution may include chromic Oxide ($CrO_3$) in a sulfuric acid solution or potassium permanganate ($KMnO_4$) in a sulfuric acid solution.

There is thus provided according to an exemplary embodiment of the disclosure, a method of separating Osmium from Iridium, comprising:
  Receiving a powdered mixture of Osmium and Iridium;
  Oxidizing the Osmium of the powdered mixture;
  Capturing the oxidized Osmium in a trapping solution;
  Reducing the oxidized Osmium from the solution to release the Osmium.

In an exemplary embodiment of the disclosure, the oxidizing comprises placing the powder in a solution and heating the solution to transfer the oxidized Osmium to gaseous form. Optionally, the solution is heated to about 110° C. In an exemplary embodiment of the disclosure, the Osmium is oxidized using a chromic Oxide ($CrO_3$) in a sulfuric acid solution. Optionally, the Osmium in the powder is oxidized by the following equation:

$$3Os + 4H_2Cr_2O_7 + 12H_2SO_4 \rightarrow 3OsO_4\uparrow + 4Cr_2(SO_4)_3 + 16H_2O.$$

Alternatively or additionally, the Osmium is oxidized using a potassium permanganate ($KMnO_4$) in a sulfuric acid solution. Optionally, the Osmium in the powder is oxidized by the following equation:

$$8KMnO_4 + 12H_2SO_4 + 5Os = 5OsO_4 + 8MnSO_4 + 4K_2SO_4 + 12H_2O.$$

In an exemplary embodiment of the disclosure, the method includes a side reaction having the following equation:

$$4KMnO_4 + 2H_2SO_4 = 4MnO_2 + 2K_2SO_4 + 3O_2 + 2H_2O.$$

In an exemplary embodiment of the disclosure, the oxidized Osmium is agitated by air or $N_2$ passing through a system for performing the method. Optionally, the oxidized Osmium is trapped in a KOH solution in one or more sequential trapping stages; and wherein the Iridium remains dissolved in the solution that oxidized the Osmium. In an exemplary embodiment of the disclosure, the oxidized Osmium of the powder is trapped in the KOH solution forming a complex according the following formula:

$$OsO_4 + 2KOH \rightarrow K_2[OsO_4(OH)_2].$$

Optionally, the KOH solution has between 10% to 25% KOH. In an exemplary embodiment of the disclosure, a Sodium Hydrosulfide solution is added to the KOH solution to precipitate the Osmium as Osmium disulfide ($OsS_2$). Optionally, the Osmium is precipitated according to the following equations:

$$NaHS + 2KOH(Excess) \rightarrow K_2S + H_2O + NaOH$$

$$2K_2[OsO_4(OH)_2] + 5K_2S + 4H_2O \rightarrow 2OsS_2\downarrow + 12KOH + K_2SO_4.$$

There is further provided according to an exemplary embodiment of the disclosure, a system for separating Osmium from Iridium comprising:

Test tubes;

Tubing for connecting between the test tubes;

Wherein said test tubes and tubing are configured to perform a method of separating Osmium from Iridium, comprising:

Receiving a powdered mixture of Osmium and Iridium;

Oxidizing the Osmium of the powdered mixture;

Capturing the oxidized Osmium in a trapping solution;

Reducing the oxidized Osmium from the solution to release the Osmium.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
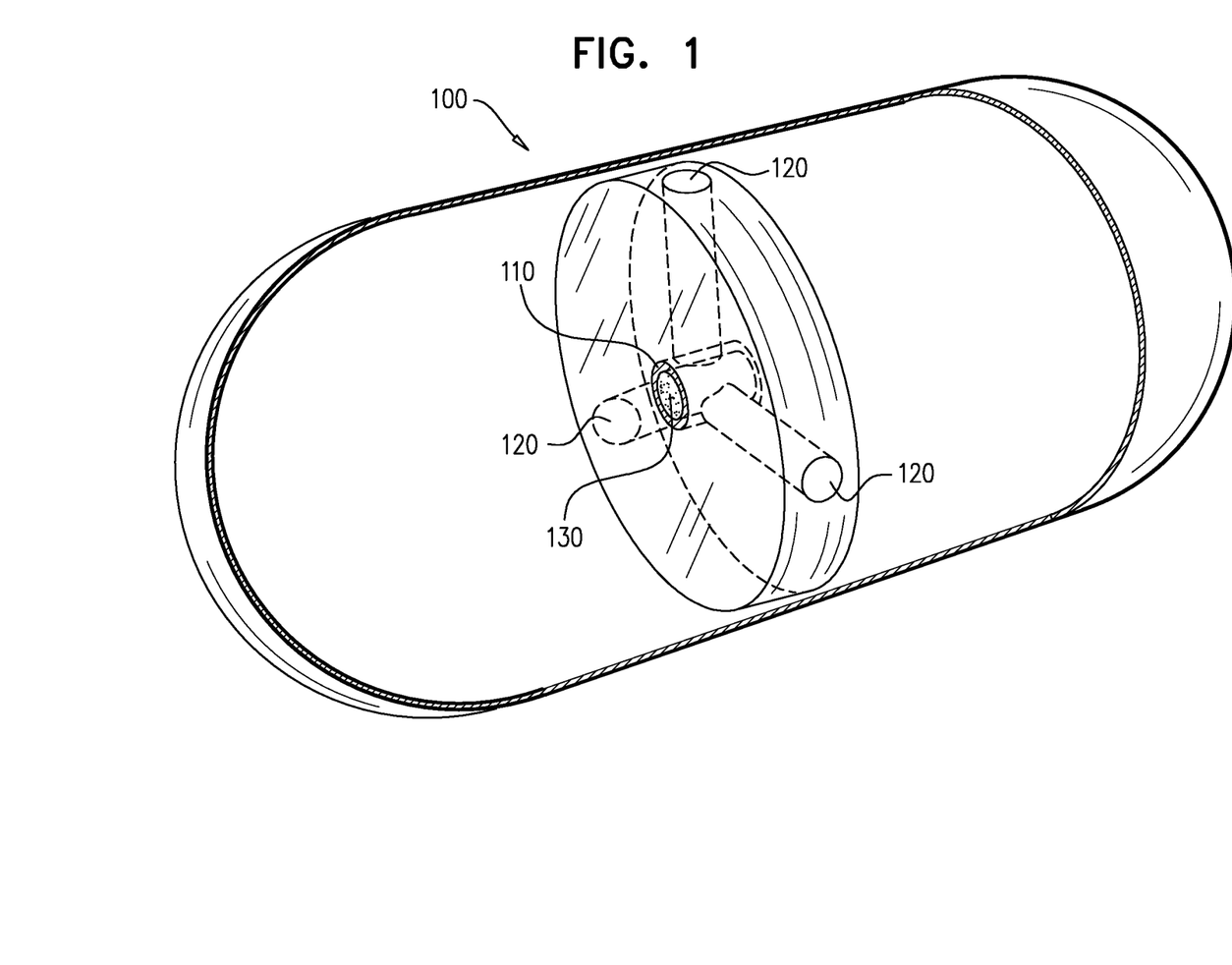
FIG. 1 is a schematic illustration of an imaging capsule with a radioactive material, according to an exemplary embodiment of the disclosure.

FIG. 1 is a schematic illustration of an imaging capsule 100 with a radioactive material 130. In an exemplary embodiment of the disclosure, the imaging capsule includes a radiation chamber 110 for placing the radioactive material 130. Optionally, radiation chamber 110 is designed with openings having collimators 120 extending therefrom so that the radiation will be emitted through the collimators to image the surroundings of imaging capsule 100.

In an exemplary embodiment of the disclosure, the radiation material 130 is composed from a radioisotope such as Os191, W181, Hg197, Tl201, Pt195m or other radioisotopes with a half life time of at least 2-3 days and having specific activity strong enough to image inside the user. In an exemplary embodiment of the disclosure, the radioisotope is processed as described below so that small amounts of the radioisotope will be surrounded by light material that will maximize efficiency by reducing blocking emission of X-rays and Gama-rays from the radioactive material. In contrast using a radiation material 130 with a highly concentrated radioisotope consistency is less cost efficient since a lot of the radiation will be blocked by the material itself.

Figure 2:
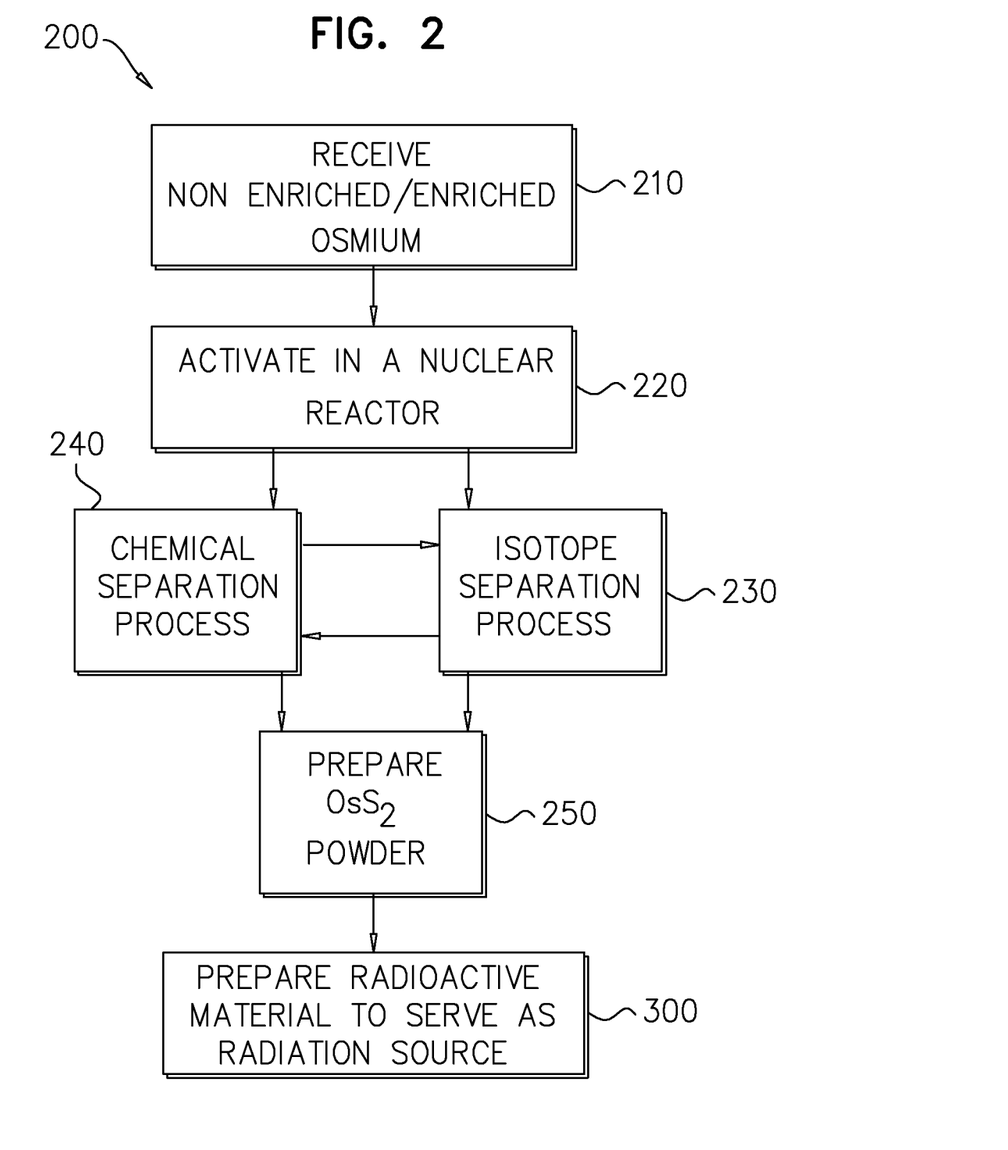
FIG. 2 is a flow diagram of a method of preparing a radioactive substance, according to an exemplary embodiment of the disclosure.

In some embodiments of the disclosure, Osmium 191 (Os 191) is used as the radioisotope for preparing a radioactive substance (e.g. in powder form) that will be used to form radioactive material 130 for use in imaging capsule 100. Os191 has a half life of about 15.4 days making it attractive for use in radioactive material 130. FIG. 2 is a flow diagram of a method 200 of preparing the radioactive substance (e.g. $OsS_2$ powder from enriched or non-enriched Osmium), according to an exemplary embodiment of the disclosure.

In an exemplary embodiment of the disclosure, enriched Osmium 190 (e.g. 92% or more enriched) is received (210) for preparing the radioactive substance. Optionally, the enriched Osmium is activated (220) in a nuclear reactor, for example by bombarding the Os 190 with an appropriate thermal neutron flux, for example of the order of 1E14 n/cm$^2$ per second to 5E15 n/cm$^2$ per second. Optionally, the activation is performed for a period of a few hours to a few hundred hours to prepare a sufficient amount of radioactive material Os191 with sufficient specific activity, for example between 10 mCi/mg to 100 mCi/mg.

In an exemplary embodiment of the disclosure, the results from the activation process include Osmium 190 (non activated), Osmium 191 and Iridium 192. Optionally, a chemical process is applied (240) to form a powder based on the Osmium molecules (of all isotopes e.g. 190, 191) and to discard the Iridium. Alternatively or additionally, an isotope separation process (230) is applied to the results of the activation process, separating between all the isotopes including between Iridium and Osmium. In some embodiments of the disclosure, the isotope separation process is applied first and renders the chemical process superfluous.

In some embodiments of the disclosure, the chemical process is applied first. Optionally, the chemical process (240) includes heating the radioactive mixture resulting from the activation process, provided as a powder, to about 200 degrees centigrade or higher in air to release an $OsO_4$ gas. Alternatively, the mixture is mixed with concentrated $HNO_3$ or $H_2SO_4$ and heated to release the $OsO_4$ gas.

Alternative strong chemical oxidation systems can be used to oxidize the radioactive mixture and release the $OsO_4$ gas. Non-limiting examples of suitable oxidizing agents include the Chromic oxide—$CrO_3$, Potassium Permanganate—$KMnO_4$ and the Hydrogen peroxide—$H_2O_2$ in Sulfuric acid—$H_2SO_4$ acidic solutions. Mixing and gradual heating of the radioactive mixture in these acidic solutions convert efficiently the osmium metal powder to the osmium tetra oxide gas required for the osmium separation as described below in exemplary chemical processes.

Further alternatively, one part Osmium powder is fused with four parts $KNO_3$ and four parts KOH at 350 to 500 degrees centigrade and dissolved in water to give $K_2[OsO_4(OH)_2]$ in an aqueous solution (with some Iridium radioisotope (Ir192) impurity in the solution). Optionally, $HNO_3$ or $H_2SO_4$ is added to neutralize the solution. The solution is heated to 50-60 degrees centigrade and $OsO_4$ is released in the process by passing an inert gas such as Argon in the solution.

In an exemplary embodiment of the disclosure, an $OsS_2$ powder is then prepared (250) by having the $OsO_4$ gas cold trapped in a KOH solution forming $K_2[OsO_4(OH)_2]$, which now has no Iridium impurities. Optionally, by adding NaHS, $OsS_2$ precipitate can be separated and dried. In an exemplary embodiment of the disclosure, the resulting $OsS_2$ powder is used as the radioisotope for production of the radioactive material 130 to be placed in radiation chamber 110 of imaging capsule 100.

In some embodiments of the disclosure, the isotope separation process (230) is applied to separate between Os191 and Os190 when it is in gas form as $OsO_4$ before being trapped by the KOH solution. Optionally, the isotope separation process (230) can be by laser isotope separation, electromagnetic isotope separation diffusion isotope separation, SILEX isotope separation, centrifugal isotope separation or any other know method of isotope separation. Optionally, when performing isotope separation, $OsF_6$ can be used instead of $OsO_4$.

In an exemplary embodiment of the disclosure, once the Osmium isotopes have been separated the same process (250) for producing $OsS_2$ powder is applied. However the advantage in separating the isotopes is that the $OsS_2$ powder can be selected to be prepared entirely with the enriched Os191 molecules instead of having both Os190 and OS191 wherein the Os191 typically constitutes only a small percent of the Osmium molecules in the $OsS_2$ powder, for example about 0.1-1 percent. Optionally, the specific activity of the isotope separated $OsS_2$ powder is approximately 100-1000 times higher (e.g. 10 mCi/μg to 100 mCi/μg) so that less powder can be used to achieve the same level of radiation. Accordingly, less of radioactive material 130 can be used as the radioactivity is more concentrated, so the size and weight of elements of imaging capsule 100 (e.g. the collimator) can be reduced.

In an exemplary embodiment of the disclosure, non-enriched Osmium can be received (210), for example a mixture of Os188, Os189, Os190 (e.g. about 26% Os190—as in its natural abundance) and all other isotope of Osmium. Optionally, the mixture is activated (220) in a nuclear reactor by bombarding it with an appropriate thermal neutron flux. After activating the mixture the isotopes are separated by a separation process (230) such as laser isotope separation, electromagnetic isotope separation diffusion isotope separation, SILEX isotope separation, centrifugal isotope separation or any other know method of isotope separation. Optionally, the separation process will separate between Os191 from all other Osmium isotopes by transforming it into a gas form such as $OsO_4$ or $OsF_6$. Afterwards the radioactive Os191 is trapped by a KOH solution and the process described above is applied to prepare (250) an $OsO_2$ powder from the Os191 molecules. Since Os191 is used, the specific activity of the powder is about 100-1000 times higher (e.g. 10 mCi/μg to 100 mCi/μg) than by preparing the powder from non-separated Os190 and Os191. Accordingly, a few micrograms of $OsO_2$ are sufficient to give the required activity per source.

Figure 3:
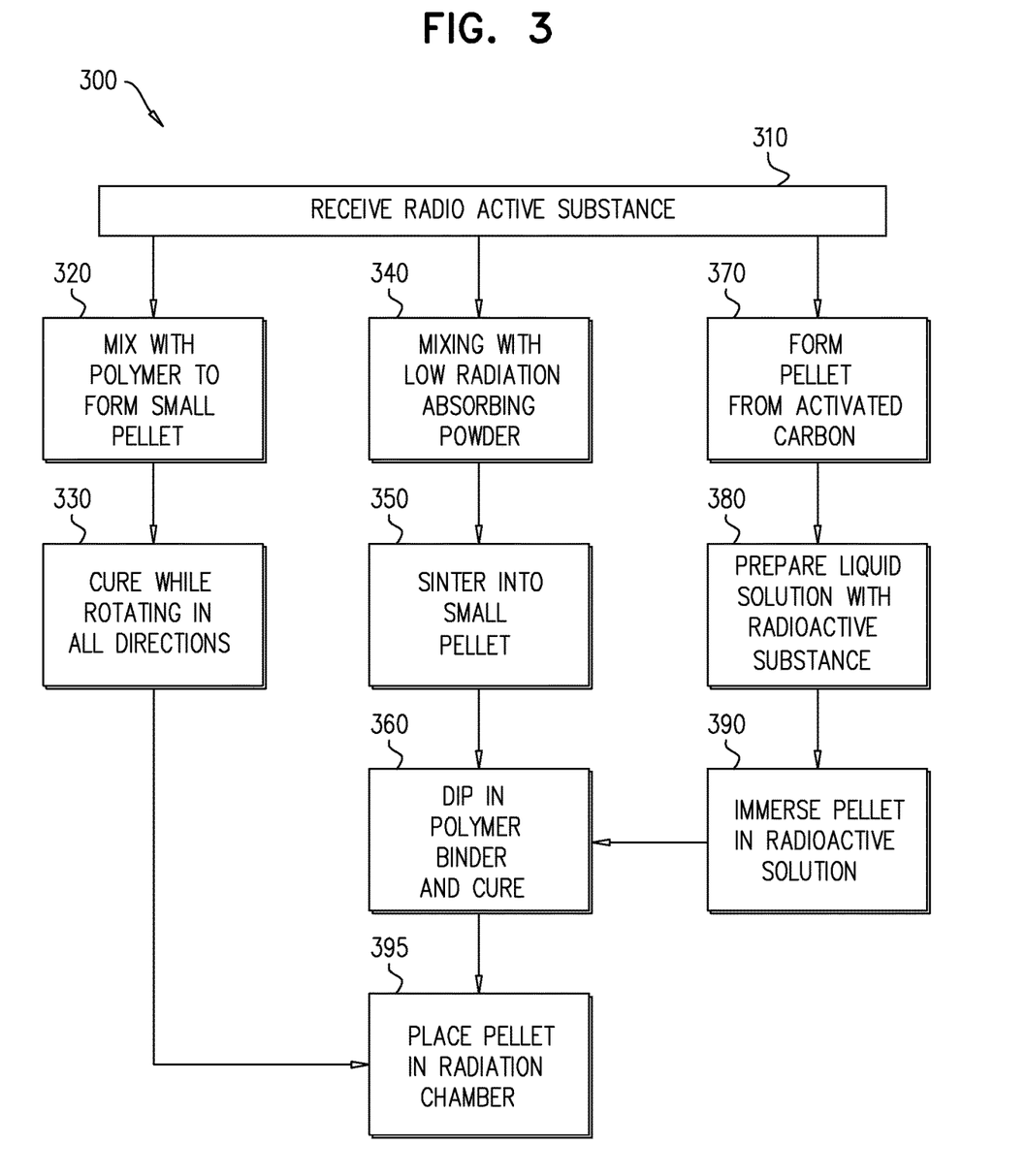
FIG. 3 is a flow diagram of a method of preparing a radioactive substance for use as a radiation source in an imaging capsule, according to an exemplary embodiment of the disclosure.

Accordingly, the initial Osmium molecules received (210) may be non-enriched or enriched. Optionally, preparation of the radioactive substance for use in preparing radioactive material 130 may be by using a chemical separation process (240), an isotope separation process (230) or a combination of both. Optionally, the use of isotope separation process (230) is generally more costly but will provide in the end a radioactive material 130 that is more homogenous and with considerably reduced self absorption relative to a radioactive material 130 prepared by only using a chemical separation process without isotope separation. Optionally, after preparing a radioactive substance (e.g. $OsO_2$ powder) from the received material, a preparation process (300) will be applied to prepare radioactive material 130 having a desired form to serve as the radiation source in imaging capsule 100 from the radioactive substance.

FIG. 3 is a flow diagram of method (300) of preparing radioactive material 130 for use as a radiation source in imaging capsule 100. In some embodiments of the disclosure, other materials can be used to prepare a radioactive substance that can then be converted into the required form to serve as radioactive material 130.

In some embodiments of the disclosure, enriched Tungsten (W180) with e.g. more than about 92% isotopic enrichment is activated in a nuclear reactor. Optionally, the Tungsten is placed in a thermal neutron flux of the order of about $1E14$ $n/cm^2$ per second to $5E15$ $n/cm^2$ per second for a period of a few hours to a few hundred hours to achieve sufficient specific activity, for example 10 mCi/mg to 100 mCi/mg of W181. Optionally, the W181 with a half life of about 121 days is provided as a powder that can serve as the radioactive substance for applying preparation process (300) to prepare radioactive material 130.

In some embodiments of the disclosure, enriched Mercury (Hg196) with e.g. more than about 92% isotopic enrichment is activated in a nuclear reactor. Optionally, the Mercury is placed in a thermal neutron flux of the order of about $1E14$ $n/cm^2$ per second to $5E15$ $n/cm^2$ per second for a period of a few hours to a few hundred hours to achieve sufficient specific activity, for example 10 mCi/mg to 100 mCi/mg of Hg197. Optionally, the Hg197 with a half life of about 64 hours is provided as a powder that can serve as the radioactive substance for applying preparation process (300) to prepare radioactive material 130.

In some embodiments of the disclosure, Platinum (Pt195m) with specific activity, for example 10 mCi/mg to 100 mCi/mg is produced to serve as the radiation source for imaging capsule 100. Pt195m has a half life of about 4 days. Optionally, the Pt195 is provided as a powder to serve as the radioactive substance for applying preparation process (300) to prepare radioactive material 130.

In some embodiments of the disclosure, Thallium (Tl201) with a half life of about 3 days is produced using a cyclotron. Optionally, the Tl201 is provided as a powder to serve as the radioactive substance for applying preparation process (300) to prepare radioactive material 130.

In an exemplary embodiment of the disclosure, the method (300) of preparing one of the radioactive substances described above or other radioactive substances for use as the radioactive material 130 in imaging capsule 100 includes:

1. Receiving the radioactive substance (310) optionally in powder form;

2. Applying one of the following three options to form a solid radiation material with grains of the radioactive substance essentially homogenously dispersed in the resulting solid and wherein the rest of the solid is made up from a less-dense material with lower radiation absorption, so that the radiation emitted by the radioactive grains will flow freely from radioactive material 130:

(I) Mixing (320) the radioactive powder with a binder polymer, for example EPO-TEK 301 that is manufactured by Epoxy Technology INC from Massachusetts U.S.A. Optionally, the mixture is placed in a small container with low absorption of X-ray and Gamma radiation (e.g. a plastic or aluminum container) to form a small pellet. The binder polymer is allowed to cure (330) slowly (e.g. with a low heat source) while keeping the pellet continuously and/or randomly rotating in 3 orthogonal axis to maintain uniform distribution of the heavy radioactive substance powder, so that it won't sink to one side. Optionally, the resulting small pellet serves as radioactive material 130 in imaging capsule 100. The pellet is then placed (395) in radiation chamber 110 to serve as radiation material 130.

(II) Mixing the radioactive powder with a low radiation absorbing polymeric paste, for example the denture silicone impression material elite HD+ manufactured by Zhermack from Italy. Either the base part, the accelerator part or their mixture can be used. Optionally, the paste mixture is placed in a small container (e.g. plastic or aluminum) and sealed with a polymer binder such as EPO-TEK 301 or other adhesive material to form a small radioactive source. The small source is then placed (395) in radiation chamber 110 to serve as radiation material 130.

(III) Mixing (340) the radioactive powder with a low radiation absorbing powder, for example aluminum powder and/or a ceramic binder. In an exemplary embodiment of the disclosure, the mixture is sintered (350) into a small pellet. Optionally, the small pellet is dipped (360) in a polymer binder such as EPO-TEK 301 or other adhesive material to prevent crumbling of the pellet. The pellet is then cured (e.g. with a low heat source) and placed (395) in radiation chamber 110 to serve as radiation material 130.

(IV) Form (370) a pellet from activated carbon. Optionally, prepare (380) a liquid solution from the radioactive substance powder, and then immerse (390) the pellet in the liquid solution, so that the activated carbon absorbs the radioactive material homogeneously in the pellet. Optionally, the pellet is dipped (360) in a polymer binder such as EPO-TEK 301 or other adhesive material to form a film around the pellet and prevent crumbling of the pellet. The pellet is then cured (e.g. with a low heat source) and placed (395) in radiation chamber 110 to serve as radiation material 130.

Exemplary Chemical Processes:

In an exemplary embodiment of the disclosure, purification of the osmium radioisotopes involves the oxidation of the osmium metal activated powder and distillation of the formed volatile $OsO_4$ gas, capturing the $OsO_4$ gas in a trapping solution and subsequent recovery of the osmium by reducing the captured osmium solution. Optionally, a strong oxidation agent such as chromic oxide ($CrO_3$) and potassium permanganate ($KMnO_4$) in a sulfuric acid solution are used as efficient oxidation systems for this process.

Following is a description of Os purification from a mixture of Os and Ir in response to the outcome of the neutron activation described above, using a chromic oxide or a potassium permanganate solution. Typically, Iridium radiates with high energies that may be harmful to the user, therefore it is desirable to form the radioactive pellet only from Osmium without Iridium.

Figure 4:
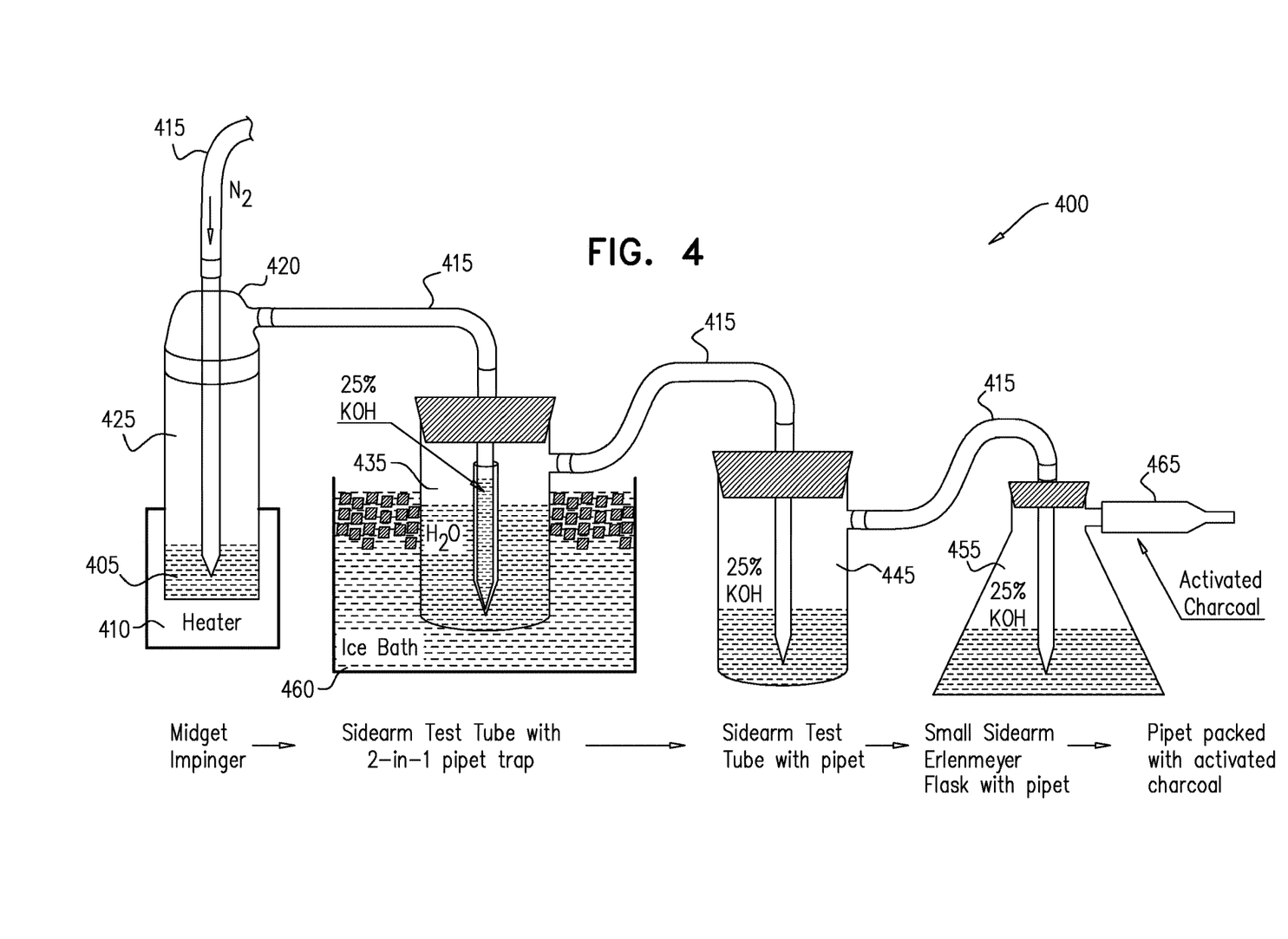
FIG. 4 is a schematic illustration of an exemplary system for performing a chemical separation process, according to an exemplary embodiment of the disclosure.

In a first embodiment Chromic Oxide is used to oxidize the powder. FIG. 4 is a schematic illustration of an exemplary system 400 for performing a chemical separation process, according to an exemplary embodiment of the disclosure. In an exemplary embodiment of the disclosure, an aluminum block heater 410 (e.g. regulated by a digital temperature controller) can be used for heating an oxidation mixture 405 to enhance oxidation. Optionally, tubes 415 and joints 420 made for example from silicon or glass can be used to connect a test tube 425 to a first collection trap 435. Likewise glass or silicon rubber tubing 415 can be used to connect a second collection trap 445 and a third collection trap 455. In an exemplary embodiment of the disclosure, the reaction mixture is agitated by $N_2$ gas or air passing through the system to help force the oxidized Osmium into the collection traps (435, 445, 455). In an exemplary embodiment of the disclosure, test tube 425 initially receives the Osmium and Iridium powder mixture. Responsive to the solution and the heating the Osmium is released as a gas to the collection traps (435, 445, 455) and the Iridium remains in test tube 425.

In an exemplary embodiment of the disclosure, 21 mg (0.11 mmol) of Osmium (Aldrich) and 1.8 mg ($1*10^{-5}$ mol) of Iridium (Aldrich) powders were placed inside a 50 mm diameter test tube 425 (15 cm effective length) fitted with a B45/40 ground glass joint 420. This was placed inside the aluminum block heater 410. The Osmium and Iridium powder mixture was added to the oxidation solution 405 that contains 1.8 gr (18 mmol) of $CrO_3$ and 135 ml of 25% $H_2SO_4$. The reaction mixture was gradually heated to about 110° C. The reaction mixture was agitated by air passing through the system 400. The air flow was regulated at 30 cc/min using a calibrated flow meter fitted with a needle-valve.

Under acidic conditions the $CrO_3$ equilibrates to $H_2Cr_2O_7$ (bi chromic acid) according to the following equation.

$$2CrO_3 + H_2O + H^+ = H_2Cr_2O_7$$

The Osmium is oxidized by bi-chromic acid to osmium tetroxide according to the following equation:

$$3Os + 4H_2Cr_2O_7 + 12H_2SO_4 \rightarrow 3OsO_4\uparrow + 4Cr_2(SO_4)_3 + 16H_2O$$

The osmium tetroxide is a volatile gas and was trapped in about 250 ml of about 25% KOH solution (or between 10% to 25%) to form a yellow complex according to the next equation:

$$OsO_4 + 2KOH \rightarrow K_2[OsO_4(OH)_2]$$

Since iridium oxide, $IrO_2$, is not volatile under these conditions, it remained dissolved or precipitated inside the test tube 425:

$$3Ir + 2H_2Cr_2O_7 + 6H_2SO_4 \rightarrow 2Cr_2(SO_4)_3 + 3IrO_2 + 8H_2O$$

The completion of the reaction (after the oxidized Osmium is captured by one or more collection traps e.g. 435, 445 and 455) can be determined by the absence of any yellow color in a freshly replaced KOH solution. Optionally, the first collection trap 435 and/or other collection traps (e.g. 445, 455) are cooled, for example by submerging the collection trap 435 in a basin 460 filled with ice to help dissolve the oxidized Osmium. In an exemplary embodiment of the disclosure, an activated charcoal filter 465 may be used as an outlet of the system to release the air or $N_2$ gas but prevent uncontrolled release of Osmium or other impurities.

In an exemplary embodiment of the disclosure, after dissolving the oxidized osmium in the KOH solution, the KOH solution is collected to recover the Osmium. In an exemplary embodiment of the disclosure, 120 ml of 10% Sodium Hydrosulfide solution is added to the Osmium complex in KOH in order to precipitate the osmium as osmium disulfide:

$$NaHS + 2KOH(Excess) \rightarrow K_2S + H_2O + NaOH$$

$$2K_2[OsO_4(OH)_2] + 5K_2S + 4H_2O \rightarrow 2OsS_2\downarrow + 12KOH + K_2SO_4$$

A very fine black solid was formed immediately which was allowed to precipitate and coagulate over night before separation. This precipitate was too fine for filtration so the suspension was centrifuged in glass tubes. The solid was washed 5 times with water (until pH~7) and then dried in a vacuum oven (80° C./20 mbar/16 h) to yield ~21.3 mg (0.084 mmol) of Osmium di sulfide which represents 76% overall Osmium yield.

In the reaction tube, the excess of $H_2Cr_2O_7$ was neutralized by the addition of $Na_2SO_3$ aqueous solution:

$$H_2Cr_2O_7 + 3H_2SO_4 + 3Na_2SO_3 \rightarrow Cr_2(SO_4)_3 + 4H_2O + 3Na_2SO_4$$

$IrO_2$ also can react with $Na_2SO_3$ giving Ir metal back $$IrO_2 + 2Na_2SO_3 \rightarrow Ir\downarrow + 2Na_2SO_4$$

The Ir was filtered out from the green solution of chromium sulfate yielding traces of metal.

In a second embodiment potassium permanganate is used to oxidize the powder. Optionally, the same experimental setup as with the chromic oxide method can be used.

In an exemplary embodiment of the disclosure, 22.6 mg (0.119 mmol) of Osmium (Aldrich) and 2.7 mg (0.014 mmol) Iridium powders were placed inside a 50 mm diameter test tube 425 (15 cm effective length) fitted with a B45/40 ground glass joint 420. The test tube 425 was placed inside the aluminum block heater 410. The Osmium and Iridium powder mixture was added to the oxidation solution 405 that contains 4.2 gr (26 mmol) of $KMnO_4$ and 135 ml of 25% $H_2SO_4$. The reaction mixture was gradually heated to 110° C. The reaction mixture was agitated by $N_2$ gas passing through the system. The $N_2$ flow was regulated at 30 cc/min using a calibrated flow meter fitted with a needle-valve. The Osmium is oxidized by potassium permanganate to osmium tetroxide according to the following equation:

$$8KMnO_4+12H_2SO_4+5Os=5OsO_4+8MnSO_4+4K_2SO_4+12H_2O$$

Possible side reaction $$4KMnO_4+2\ H_2SO_4=4MnO_2+2+K_2SO_4+3O_2+2H_2O$$

The osmium tetroxide is a volatile gas and was trapped in about 100 ml of 10% KOH solution (or between 10% to 25%) to form a yellow complex according to the next equation:

$$OsO_4+2KOH \rightarrow K_2[OsO_4(OH)_2]$$

Since iridium oxide, $IrO_2$, is said not to be volatile under these conditions, it remained dissolved or precipitated inside the test tube.

The completion of the reaction was determined by the absence of any yellow color in a freshly replaced KOH solution.

2.5 ml of 10% Sodium Hydrosulfide (NaHS) solution was added to the Osmium complex in the KOH trap in order to precipitate the osmium as osmium disulfide:

$$NaHS+2KOH(Excess) \rightarrow K_2S+H_2O+NaOH$$

$$2K_2[OsO_4(OH)_2]+5K_2S+4H_2O \rightarrow 2OsS_2\downarrow+12KOH+K_2SO_4$$

A very fine black solid was formed immediately which was allowed to precipitate and coagulate over night before separation. This precipitate was centrifuged in glass tubes and washed 5 times with water (until pH~7) and then dried in a vacuum oven (60° C./20 mbar/48 h). The process yield was ~75%.

To the reaction tube containing the excess of permanganate acidic solution with the formed black MnO2 precipitate and the $IrO_2$ left, $Na_2SO_3$ aqueous solution was added. Reduction of $MnO_2$ to $MnSO_4$ is occurred and the undissolved residue was determined to be the left Ir ($IrO_2$) behind.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of separating osmium from iridium comprising:
   receiving a powdered mixture of osmium and iridium;
   oxidizing the osmium of the powdered mixture;
   separating the oxidized osmium into different isotopes of osmium, including osmium 191;
   capturing the oxidized osmium 191 a trapping solution;
   reducing the oxidized osmium 191 solution to release the osmium 191.

2. The method according to claim 1, wherein the oxidizing comprises placing the powdered mixture in a solution and heating the solution to transfer the oxidized osmium to gaseous form.

3. The method according claim 1, wherein the trapping solution is heated to about 110° C.

4. The method according to claim 1, wherein the osmium is oxidized using chromium trioxide ($CrO_3$) in a sulfuric acid solution.

5. The method according to claim 1, wherein the osmium in the powder is oxidized by the following equation:

$$3Os+4H_2Cr_2O_7+12H_2SO_4 \rightarrow 3OsO_4\uparrow+4\ Cr_2(SO_4)_3+16H_2O.$$

6. The method according to claim 1, wherein the osmium is oxidized using a potassium permanganate ($KMnO_4$) in a sulfuric acid solution.

7. The method according to claim 6, wherein the osmium in the powder is oxidized by the following equation:

$$8KMnO_4+12H_2SO_4+5Os=5OsO_4+8MnSO_4=4K_2SO_4+12H_2O.$$

8. The method according to claim 7. wherein the method includes a side reaction having the following equation:

$$4KMnO_4+2\ H_2SO_4=4MnO_2+2\ K_2SO_4+3\ O_2+2H_2O.$$

9. The method according to claim 1, wherein the oxidized osmium is agitated by air or $N_2$ passing through a system for performing the method.

10. The method according to claim 1, wherein the oxidized osmium 191 is trapped in a KOH solution in one or more capturing stages.

11. The method according to claim 10, wherein the oxidized osmium 191 of the powdered mixture is trapped in the KOH solution forming a complex according the to following formula:

$$OsO_4+2KOH \rightarrow K_2\ [OsO_4\ (OH)_2].$$

12. The method according to claim 10, wherein the KOH solution has between 10% to 25% KOH w/v.

13. The method according to claim 10, wherein a sodium hydrosulfide solution is added to the KOH solution to precipitate the osmium as osmium disulfide ($OsS_2$).

14. The method according to claim 13, wherein the osmium is precipitated according to the following equations:

$$NaHS+2KOH\ (Excess) \rightarrow K_2S+H_2O+NaOH$$

$$2K_2[OsO_4\ (OH)_2]+5K_2S+4H_2O \rightarrow 2OsS_2\downarrow+12KOH+K_2SO_4.$$

15. The method according to claim 1, wherein said separating is performed by laser isotope separation.

16. The method according to claim 1, wherein said separating is performed by electromagnetic isotope separation.

17. The method according to claim 1, wherein said separating is performed by diffusion isotope separation.

18. The method according to claim 1, wherein said separating is performed by SILEX isotope separation.

19. The method according to claim 1, wherein said separating is performed by centrifugal isotope separation.

\* \* \* \* \*